United States Patent
Fontova et al.

(10) Patent No.: US 7,675,434 B2
(45) Date of Patent: Mar. 9, 2010

(54) METHOD AND DEVICE FOR DETECTING, ON THE GROUND, THE OBSTRUCTION OF A PRESSURE TAP OF A STATIC PRESSURE SENSOR OF AN AIRCRAFT

(75) Inventors: Laurent Fontova, Toulouse (FR); Sebastien Freissinet, Toulouse (FR)

(73) Assignee: Airbus France, Toulouse (FR)

( * ) Notice: Subject to any disclaimer, the term of this patent is extended or adjusted under 35 U.S.C. 154(b) by 179 days.

(21) Appl. No.: 11/816,078

(22) PCT Filed: Feb. 2, 2006

(86) PCT No.: PCT/FR2006/000228

§ 371 (c)(1), (2), (4) Date: Aug. 10, 2007

(87) PCT Pub. No.: WO2006/087440

PCT Pub. Date: Aug. 24, 2006

(65) Prior Publication Data

US 2008/0150763 A1    Jun. 26, 2008

(30) Foreign Application Priority Data

Feb. 14, 2005    (FR) .................................. 05 01453

(51) Int. Cl.
| | |
|---|---|
| G08B 21/00 | (2006.01) |
| G08B 23/00 | (2006.01) |
| G05D 1/00 | (2006.01) |
| G05D 1/06 | (2006.01) |
| G01C 5/00 | (2006.01) |
| G01C 22/00 | (2006.01) |
| G06F 7/00 | (2006.01) |

(52) U.S. Cl. .................. 340/945; 340/608; 340/967; 340/970; 701/3; 701/9; 701/10; 701/23; 701/29

(58) Field of Classification Search ................. 340/608, 340/945, 967, 970; 701/3, 9, 10, 23, 29
See application file for complete search history.

(56) References Cited

U.S. PATENT DOCUMENTS 4,598,381 A    7/1986    Cucci (Continued)

FOREIGN PATENT DOCUMENTS

| DE | 3618798 | 12/1987 |
|---|---|---|
| FR | 2703155 | 9/1994 |
| FR | 2847669 | 5/2004 |
| FR | 2857447 | 1/2005 |
| GB | 2049954 | 12/1980 |
| WO | 9841911 | 9/1998 |

OTHER PUBLICATIONS

PCT International Search Report dated Jul. 6, 2006.

*Primary Examiner*—Benjamin C Lee
*Assistant Examiner*—Lam P Pham
(74) *Attorney, Agent, or Firm*—Dickinson Wright PLLC

(57) ABSTRACT

A method and device for detecting, on the ground, the obstruction of a pressure tap of a static pressure sensor of an aircraft. The device includes a pressure sensor that measures the pressure inside a probe and a heating system for heating the probe. When the heating system is activated, the sensor carries out a first measurement of a parameter dependent on the pressure inside the probe. After a predetermined duration from the activation of the heating system, the sensor carries out a second measurement of the parameter. A central processing unit calculates the difference between the first and second measurements and compares this difference to a predetermined value. A warning device emits a warning signal indicating the detection of an obstruction if the difference is greater than the predetermined value.

14 Claims, 2 Drawing Sheets

U.S. PATENT DOCUMENTS

| | | |
|---|---|---|
| 5,374,014 A | 12/1994 | Traverse et al. |
| 5,537,869 A | 7/1996 | Lopez |
| 5,946,642 A | 8/1999 | Hedrick |
| 6,414,282 B1 * | 7/2002 | Ice et al. ................ 219/481 |
| 6,609,421 B2 * | 8/2003 | Cronin et al. ........... 73/170.02 |
| 6,668,640 B1 | 12/2003 | Alwin et al. |
| 6,804,600 B1 | 10/2004 | Uluyol et al. |
| 6,993,419 B2 * | 1/2006 | D'Ouince et al. ............ 701/3 |
| 2004/0111193 A1 | 6/2004 | D'Ouince et al. |
| 2005/0010389 A1 | 1/2005 | D'Ouince et al. |

\* cited by examiner

METHOD AND DEVICE FOR DETECTING, ON THE GROUND, THE OBSTRUCTION OF A PRESSURE TAP OF A STATIC PRESSURE SENSOR OF AN AIRCRAFT

FIELD OF THE INVENTION

The present invention relates to a method and a device for detecting the obstruction of a pressure tap of at least one static pressure sensor of an aircraft, on the ground.

BACKGROUND OF THE RELATED ART

Usually, such a static pressure sensor is part of an anemometric unit which is intended to measure air data and so determine values of parameters such as the altitude of the aircraft, its speed, etc., which are in particular used to pilot the aircraft.

It is known that such a static pressure sensor normally comprises at least:
- a probe provided with a pressure tap passing through the fuselage of the aircraft;
- a module that is linked by a pipe to said probe; and
- an activatable heating system which is provided to heat said probe.

Any failure of such a static pressure sensor must of course be able to be detected quickly and reliably, since otherwise, the measurements taken will provide erroneous values for the abovementioned parameters (used for piloting), which can have very damaging consequences for the security of the aircraft when in flight.

It is known that human errors, in particular on airplane maintenance operations, can lead to the failure of such a static pressure sensor.

For example, the people responsible for washing the airplane often stick a piece of adhesive tape over the pressure tap of the probe, in order to prevent water from penetrating into the pipe linked to said probe during said washing. If the removal of the piece of adhesive tape after washing is forgotten, the pressure sensor will fail on the next flight of the aircraft, since it cannot measure the air pressure outside the fuselage. It will in fact measure the air pressure imprisoned in the pipe which is sealed (at its probe side end) by the piece of adhesive tape, this measured pressure obviously being different in flight from the outside pressure.

Various solutions are known (patent applications FR-2 847 669 and FR-2 857 447, for example) making it possible to detect the failure of a pressure sensor which is part of an anemometric unit of an aircraft. However, the known solutions only make it possible to detect a failure when the aircraft is flying. In the case of such a detection in flight, it is simply possible to stop taking into account during the rest of the flight the measurements taken by the failed pressure sensor, in order not to take account of false measurements (which is obviously important for safety), but repairing the failed pressure sensor is not possible. Although an anemometric unit of an aircraft normally comprises several pressure sensors so that the failure of one of said pressure sensors does not prevent the flight from continuing, the failure to take into account the data from a pressure sensor can, nevertheless, have a negative effect on the accuracy of the values of the parameters used to pilot the aircraft, which are derived from the measurements taken by this anemometric unit.

SUMMARY OF THE INVENTION

The object of the present invention is to remedy these drawbacks. It relates to a method for detecting, on the ground, quickly and reliably, and inexpensively, any obstruction of a pressure tap of a probe of at least one static pressure sensor of an aircraft, in particular of an airplane, said static pressure sensor being provided to measure the pressure inside the probe and comprising, in addition to said probe, at least one activatable heating system provided to heat the latter.

To this end, according to the invention, said method is noteworthy in that:
a) on activation of the heating system of at least one static pressure sensor, a first measurement is taken using said static pressure sensor of at least one parameter dependent on the pressure inside said probe;
b) a first predetermined duration after said activation of the heating system, a second measurement of said parameter is taken using said static pressure sensor;
c) the difference between said first and second measurements is calculated;
d) the duly calculated difference is compared with a predetermined value; and
e) if this difference is greater than said predetermined value, a warning signal is emitted, indicating the detection of an obstruction.

The present invention therefore takes account of the fact that if the pressure tap of the probe is blocked or obstructed, for example by a piece of adhesive tape, the air imprisoned inside this probe will heat up immediately the heating system of the probe is activated such that the static pressure inside the probe that is measured by the static pressure sensor will then very quickly increase. This increase can be detected by directly monitoring the static pressure or by monitoring another parameter, in particular the barometric altitude or the barometric altitude rate, which depends on this static pressure.

Since usually the heating system of the probe is activated on the ground, normally immediately at least one engine of the aircraft is started up or when the aircraft begins to taxi or on activation of a general heating system, it is possible, thanks to the invention, to monitor the obstruction of a pressure tap of a static pressure probe when the aircraft is still on the ground. Thus, if such an obstruction is detected, the maintenance personnel can quickly unblock the obstructed probe before the aircraft takes off. The failed static pressure sensor is therefore rapidly returned to operation and can be used as early as the scheduled flight, unlike what happens for the abovementioned usual solutions.

Advantageously, there is also implemented monitoring of the state of activation of said heating system of the static pressure sensor and, in the step a), said first measurement is taken immediately the activation of said heating system is detected thanks to said monitoring.

In a particular embodiment, in the step e), a warning signal is emitted only if said difference is greater than said predetermined value for at least one second predetermined duration.

As indicated previously, said measured parameter can represent the barometric altitude. In this case, preferably, two static pressure sensors are used and each of said first and second measurements of the barometric altitude is taken using air data supplied by these two static pressure sensors.

Said measured parameter can also represent the barometric altitude rate.

obviously, in a simplified variant, said parameter simply represents the static pressure that is present inside the probe and that is measured by the static pressure sensor.

The present invention also relates to a device for detecting on the ground the obstruction of a pressure tap of a probe of at least one static pressure sensor of an aircraft, said static pressure sensor being provided to measure the pressure inside said probe and comprising, in addition to said probe, at least one activatable heating system provided to heat the latter. According to the invention, said device comprises:

at least said static pressure sensor to take:
on activation of the heating system of said static pressure sensor, a first measurement of at least one parameter dependent on the pressure inside said probe; and
a first predetermined duration after said activation of the heating system, a second measurement of said parameter;
at least one central processor unit to calculate the difference between said first and second measurements and compare the duly calculated difference with a predetermined value; and
warning means to emit a warning signal indicating the detection of an obstruction, if said difference is greater than said predetermined value.

Said device makes it possible to provide effective and robust monitoring of at least one static pressure sensor of an aircraft.

In a preferred embodiment, the device according to the invention also comprises at least one means for monitoring the state of activation of said heating system of the static pressure sensor.

Furthermore, said central processor unit can be part in particular:

of a central alarm computer, of "FWC" (Flight Warning Computer) type; or
of an inertial reference and anemometric data unit, of "ADIRU" (Air Data Inertial Reference Unit) type.

Moreover, in a particular embodiment, said warning means comprise a screen for displaying warning messages, of "ECAM" (Electronic Centralized Aircraft Monitoring) type.

BRIEF DESCRIPTION OF THE DRAWINGS

The figures of the appended drawing will clearly show how the invention can be produced. In these figures, identical references denote similar items.

DETAILED DESCRIPTION OF THE INVENTION

Figure 1:
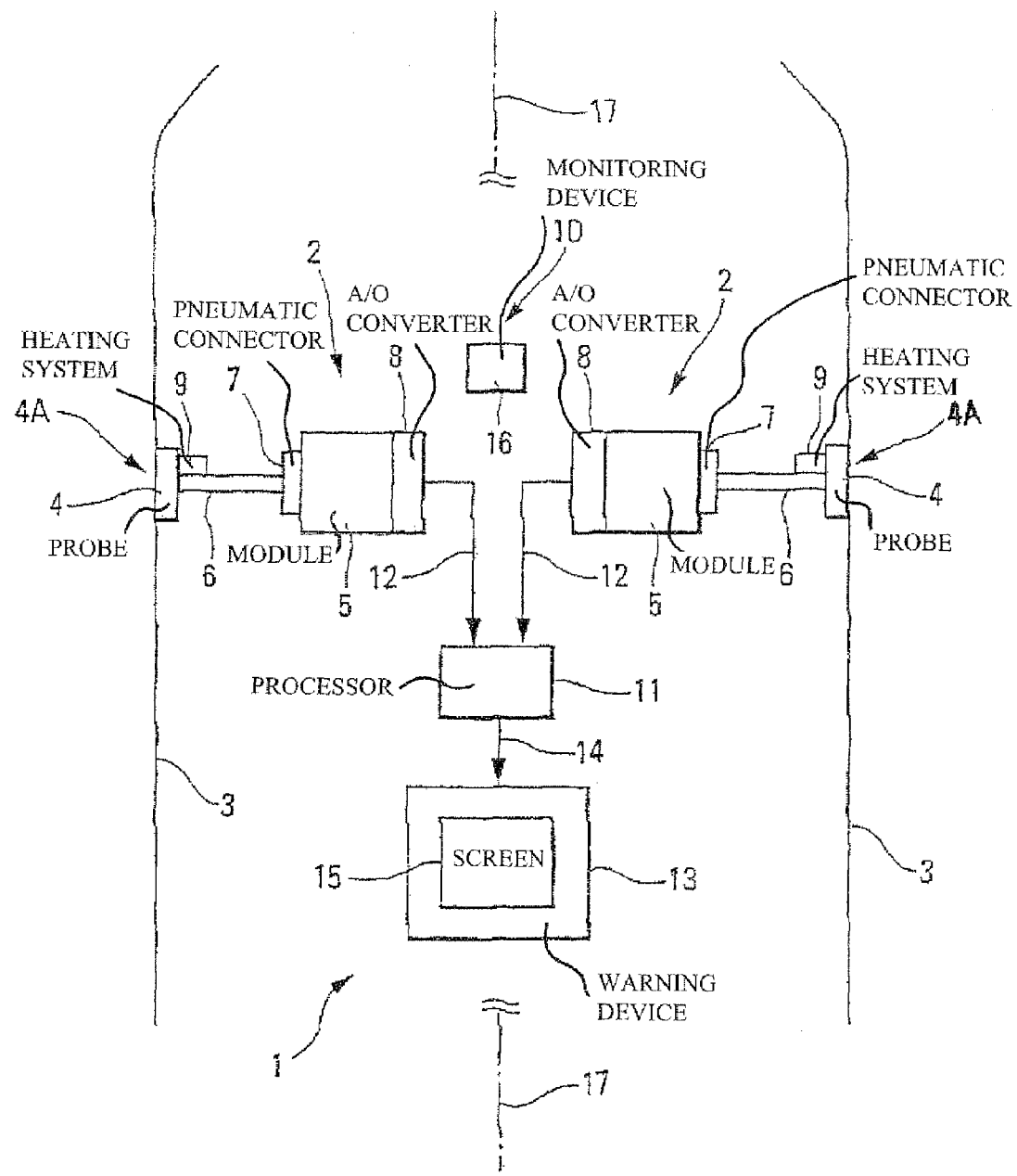
FIG. 1 is the block diagram of a device according to the invention.

The device 1 according to the invention and diagrammatically represented in FIG. 1 is intended to monitor at least one static pressure sensor 2 of an aircraft, in particular of a transport airplane, of which only a part of the fuselage 3 is shown in this FIG. 1 for reasons of drawing simplicity.

More specifically, said device 1 is intended to detect any obstruction of a pressure tap 4A of a probe 4 of at least one static pressure sensor 2 of the aircraft.

It is known that such a static pressure sensor 2 is normally part of an anemometric unit 10 which is intended to measure air data, making it possible to determine parameter values such as the altitude, the speed, and so on of the aircraft. These parameters are in particular used to pilot the aircraft. Usually, a static pressure sensor 2 comprises:

a probe 4 which is fitted transversally on the fuselage 3 of the aircraft and accesses the outside via a pressure tap 4A;
a module 5 which is linked by a pipe 6 to the probe 4. Normally, the pipe 6 which provides a pneumatic link is connected to the module 5 by means of an pneumatic connector 7 which makes it possible to easily and quickly disconnect and reconnect it. Furthermore, an analog/digital converter 8 can be associated with said module 5; and
a usual heating system 9, which is provided to heat said probe 4 and which can be actuated manually and/or automatically.

According to the invention, to detect a failure of the static pressure sensor 2 due to the fact that the pressure tap 4A is obstructed (or blocked), said device 1 comprises:

at least said monitored static pressure sensor 2.
This static pressure sensor 2 is formed to take:
immediately said heating system 9 is activated, a first measurement of at least one parameter specified below, which depends on the pressure inside said probe 4; and
a first predetermined duration after this activation of the heating system 9, a second measurement of said same parameter;
at least one central processor unit 11 which is linked by a link 12 to said module 5, to calculate the difference between said first and second measurements and compare this difference to a predetermined value specified below; and
warning means 13 which are linked by a link 14 to said central processor unit 11, to emit a warning signal (visual and/or audible) indicating the detection of an obstruction, if the central processor unit 11 indicates to the warning means that the abovementioned difference is greater than said predetermined value.

In a particular embodiment, said warning means 13 emit a warning signal only if said difference is greater than said predetermined value for at least one second predetermined duration, also specified below.

The device 1 according to the invention therefore takes into account the fact that, if the pressure tap 4A of the probe 4 is blocked or obstructed, for example by a piece of adhesive tape, the air that is imprisoned inside this probe 4 (and the pipe 6) will heat up immediately the heating system 9 of the probe 4 is activated so that the static pressure inside the probe 4 (and the pipe 6) which is measured by the static pressure sensor 2 will then increase very rapidly and significantly. This increase can be detected by the device 1, either by directly monitoring the measured static pressure, or by monitoring another parameter (in particular the barometric altitude) which depends on this static pressure and varies abnormally when the latter varies abnormally.

Since usually the heating system 9 of the probe 4 is activated on the ground, normally immediately at least one engine (not shown) of the aircraft is started or when the aircraft begins to taxi or when the crew engages the probe heating pushbutton ("probe/windows heat pushbutton"), the device 1 is able to measure the obstruction of the pressure tap 4A of this probe 4, when the aircraft is still on the ground. Thus, if such an obstruction is detected on the ground, the maintenance personnel can quickly unblock the obstructed probe 4, and this before the aircraft takes off. The failed static pressure sensor 2 is therefore rapidly repaired and returned to normal operation, and it can be used as early as the scheduled flight.

In a preferred embodiment, the device 1 according to the invention also comprises a means 16 for monitoring the state of activation of said heating system 9 of the monitored static pressure sensor 2. This means 16 informs the device 1 immediately it detects the activation of said heating system 9 such that the device 1 can then take the abovementioned necessary measures. For this, said means 16 can in particular monitor the starting up of a first engine of the aircraft and/or the activation of a general heating system and/or the start of taxiing of the aircraft.

Obviously, the device 1 according to the invention can simultaneously monitor several static pressure sensors 2.

It is known that, normally, an anemometric unit 10 of an aircraft is linked to at least two static pressure sensors 2, the pressure taps 4A of which are fitted either side of the longitudinal axis 17 of the fuselage 3 of the aircraft, as shown in FIG. 1.

It will also be noted that a civilian transport airplane normally has three anemometric units 10 of this type, of which:
- a first supplies data that is displayed in the Cockpit, for the attention of the pilot;
- a second supplies data that is displayed in the Cockpit, for the attention of the co-pilot; and
- a third is used as backup to safeguard, if necessary, against the failure of said first and second anemometric units 10.

The device 1 can monitor all the static pressure sensors 2 of one anemometric unit 10 or all the static pressure sensors 2 of all the anemometric units 10 of the aircraft. For this, each time it comprises the static pressure sensors 2 that it monitors.

It will be noted that the link 12 used to link a module 5 to the central processor unit 11 is an electrical link, preferably implemented in the form of a communication bus to the "ARINC 429" standard. The integration of different modules 5 directly in the central processor unit 11 could also be envisaged.

Figure 2:
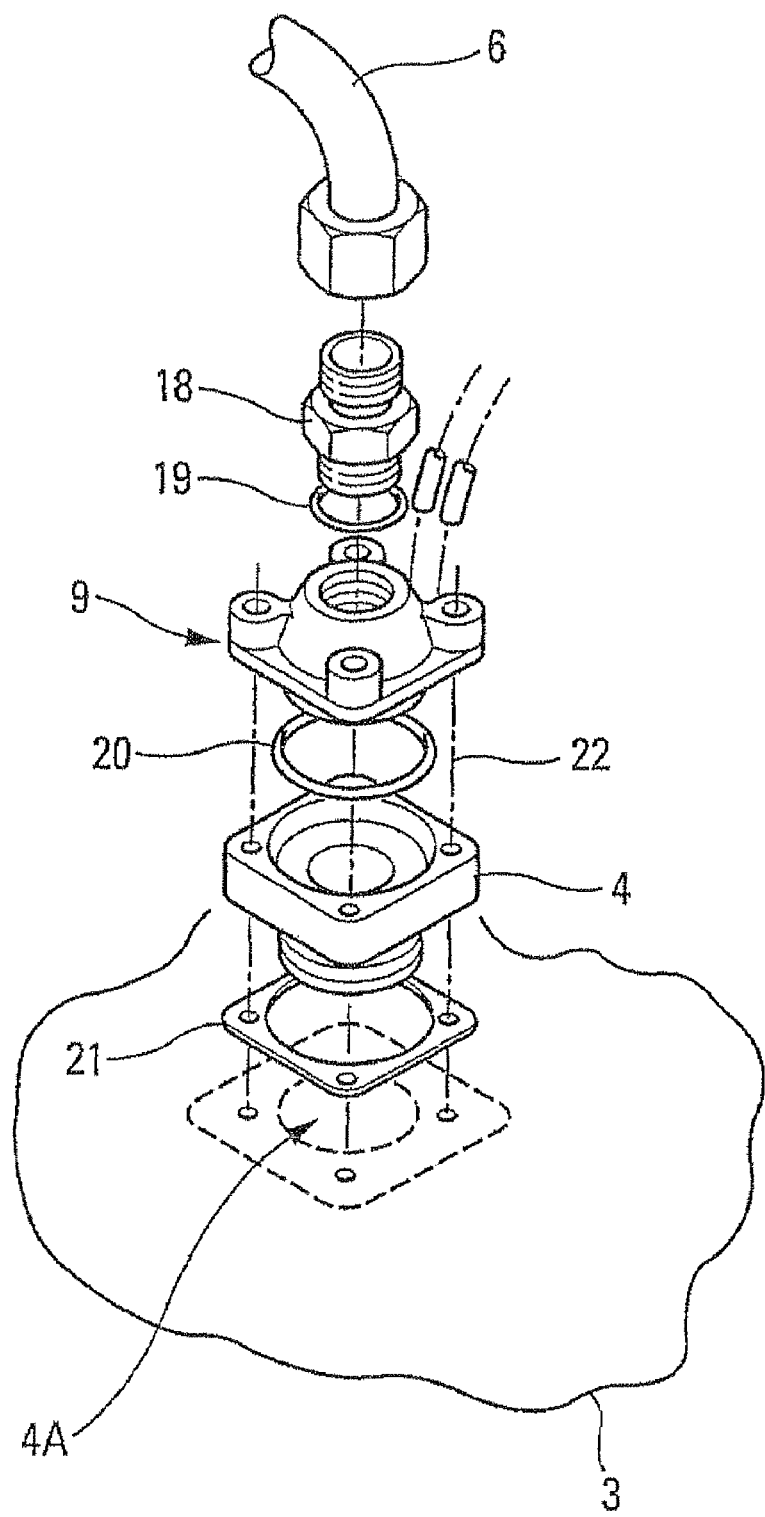
FIG. 2 shows the details of a pressure sensor which can be monitored by a device according to the invention.

FIG. 2 shows an exemplary assembly of a probe 4 on the fuselage 3 of an aircraft. For this, this assembly usually comprises, between said pipe 6 and the fuselage 3, the following elements in turn:
- a screw coupling 18;
- a washer 19;
- the heating system 9 which is preferably of electrical type;
- a washer 20;
- the static pressure probe 4; and
- a washer 21, the elements 9, 4 and 21 possibly being fixed by common bolts to the fuselage 3, as illustrated by the chain dotted lines 22.

Furthermore, said central processor unit 11 can be part in particular:
- of a central alarm computer, of "FWC" (Flight Warning Computer) type; or
- of an inertial reference and anemometric data unit, of "ADIRU" (Air Data Inertial Reference Unit) type.

Moreover, in a particular embodiment, said warning means 13 comprise a screen 15, in particular a screen for displaying warning messages, of "ECAM" (Electronic Centralized Aircraft Monitoring) type.

In a first embodiment, the parameter measured by the device 1 represents the barometric altitude of the aircraft. The purpose of the device 1 is then to detect any significant and sudden barometric altitude variation, on activation of the (or each) heating system 9 of the (or each) monitored static pressure sensor 2. In this case, preferably, the device 1 monitors and includes two static pressure sensors 2, and each of the first and second measurements of the barometric altitude is taken using air data supplied by each of these two static pressure sensors 2. The barometric altitude is then calculated each time, in the usual manner, from the static pressure averaged from the static pressure measurements taken by these two static pressure sensors 2 which are preferably located on the right and left sides of the aircraft.

Furthermore, in this first embodiment, it is possible to use, as an example, the following predetermined values:
- as first predetermined duration: 60 seconds;
- as predetermined barometric altitude value, with which the barometric altitude difference between the first and second measurements is compared: 20 feet (approximately 6 meters); and
- as second predetermined duration: 5 seconds.

Also, in a second embodiment, the parameter measured by the device 1 represents the barometric altitude rate.

Moreover, in a third simplified embodiment, the device 1 uses, as monitored parameter, the static pressure which is directly measured by the (or each) monitored static pressure sensor 2, that is, the static pressure that exists inside the probe 4 and the pipe 6 of each monitored static pressure sensor 2.

In this third embodiment, it is possible to use, as an example, the following predetermined values:
- as first predetermined duration: 75 seconds;
- as predetermined static pressure value, with which the difference between the first and second static pressure measurements is compared: 1 mbar; and
- as second predetermined duration: 10 seconds.

The device 1 according to the invention therefore makes it possible to provide an effective and robust monitoring of at least one static pressure sensor 2 of an aircraft.

The invention claimed is:

1. A method for detecting the obstruction of a pressure tap of a probe of at least one pressure sensor of an aircraft, said pressure sensor being provided to measure the pressure inside the probe and comprising, in addition to said probe, at least one activatable heating system provided to heat the latter, said method comprising:
   a) on activation of the heating system of at least one pressure sensor, taking a first measurement using said pressure sensor of at least one parameter dependent on the pressure inside said probe;
   b) a first predetermined duration after said activation of the heating system, taking a second measurement of said parameter using said pressure sensor;
   c) calculating the difference between said first and second measurements;
   d) comparing the calculated difference with a predetermined value; and
   e) if this difference is greater than said predetermined value, an alert signal is emitted, indicating the detection of an obstruction.

2. The method as claimed in claim 1, wherein monitoring of the state of activation of said heating system of the pressure sensor is implemented, and in the step a), said first measurement is taken immediately the activation of said heating system is detected based on said monitoring.

3. The method as claimed in claim 1, wherein, in the step e), a warning signal is emitted only if said difference is greater than said predetermined value for at least one second predetermined duration.

4. The method as claimed in claim 1, wherein said parameter represents the barometric altitude.

5. The method as claimed in claim 4, wherein two pressure sensors are used, and each of said first and second measurements of the barometric Altitude is taken using air data supplied by these two pressure sensors.

6. The method as claimed in claim 1, wherein said parameter represents the barometric altitude rate.

7. The method as claimed in claim 1, wherein said parameter corresponds to the static pressure present inside the probe.

8. A device for detecting the obstruction of a pressure tap of a probe of at least one pressure sensor of an aircraft, said pressure sensor being provided to measure the pressure inside the probe and comprising, in addition to said probe, at least one activatable heating system provided to heat the latter, wherein said device comprises:

at least said pressure sensor which is formed to take:

on activation of the heating system of said pressure sensor, a first measurement of at least one parameter dependent on the pressure inside said probe; and a first predetermined duration after said activation of the heating system, a second measurement of said parameter;

at least one central processor unit which is formed to calculate the difference between said first and second measurements and compare the duly calculated difference with a predetermined value; and warning means which are formed to emit a warning signal indicating the detection of an obstruction, if said difference is greater than said predetermined value.

9. The device as claimed in claim 8, wherein it also comprises at least one means for monitoring the state of activation of said heating system of the pressure sensor.

10. The device as claimed in claim 8, wherein said central processor unit is part of a central alarm computer.

11. The device as claimed in claim 8, wherein said central processor unit is part of an inertial reference and anemometric data unit.

12. The device as claimed in claim 8, wherein said warning means comprise a screen for displaying warning messages.

13. An aircraft, including a device provided to implement the method specified under claim 1.

14. An aircraft, including a device as specified under claim 8.

* * * * *